Patented June 7, 1927.

1,631,252

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

PRODUCT OBTAINED FROM MOLASSES AND PROCESS OF PREPARING SAME.

No Drawing.     Application filed December 29, 1922. Serial No. 609,765.

The invention relates to a process for producing from molasses and distillery slop liquors a product valuable as a fertilizer for soils, and relates also to the novel products obtained in carrying out such process.

In the production of sugar from sugar-producing plants, as sugar-cane, sorghum, sugar beets, etc., there are large quantities of refuse molasses produced and known as "black strap"—from two and one-half to five or more gallons of this refuse molasses being obtained as a rule from every ton of cane ground. As is well-known, this refuse molasses contains a high percentage of potash which is very valuable as a fertilizer, for example, for the soils in which the sugar cane or sugar beets are grown. It is, however, impracticable to turn this molasses back upon the soil directly, as it is in inconvenient form for handling and distribution and contains substances which are generally considered poisonous to the soil.

Various attempts have been made to treat the molasses, in mass, to render it suitable for use as a fertilizer, and similarly the slop liquors resulting from the fermentation and distillation operations in the production of alcohol from the molasses. Such slop liquors, however, still contain in addition to desirable potash salts which were present in the original molasses before fermentation and distillation also the said objectionable substances. The principal difficulties encountered heretofore in attempts to render these valuable products of the molasses and slop liquors available on a commercial scale for fertilizer purposes were the low melting point of the constituents and the exceedingly hygroscopic character of the solids after they have been reduced to dry state.

In treating molasses, or the distillery slop liquors obtained therefrom, by the novel process forming the subject of the present invention, it is possible not only to recover the valuable potash salts thereof, but to eliminate therefrom the substances regarded as objectionable and the hygroscopic character of the product when dried in mass.

To obtain this desirable result, the molasses, or the slop liquor, is atomized, or preferably sprayed, into a gaseous desiccating medium. The temperature of such medium, however, is sufficiently high to not only evaporate the moisture from the finely-divided or atomized molasses or liquor and provide same in the form of dry solid particles, but also, if desired, to subsequently roast and destructively distill such particles, as while the same are in suspension. This will leave, as a residue, finely-divided, charred or coked particles which contain the potash salts present in the original solution and which particles may be used directly for fertilizer purposes, the objectionable substances having been destroyed by the heat.

In the case of the distillery slop liquors, which are of much lower solid content than molasses, it may be necessary first to preliminarily concentrate same before the spraying operation; but with the molasses no difficulty will be encountered in reducing same directly to the powdered condition by spraying into hot gases. Lower spray pressures will prevail also in the treatment of the former than in the case of the latter; and I have found that with molasses with a 50% or more content of solids, spray pressures exceeding 500 lbs. per square inch are satisfactory. The temperatures to which the sprayed molasses or liquor is to be subjected should exceed 212° F. and may range as high as 2500° F.

Moreover, the powdered product thus obtained may be lixiviated in well-known manner and the potash salts recovered therefrom; and the charred material remaining may be used for fuel or other purposes.

Or, the dry powdered material may be incinerated and burned and the ashes which are very rich in potash may be used for fertilizer purposes, or as a material for the provision of potash. It is important, if powdered molasses in uncharred condition be handled in this manner, that some other bulking material be mixed with it as the powdered molasses or distillery slop liquor product when again heated will otherwise tend to melt and run together in mass. I may use for this purpose various bulking materials, such as saw-dust, ground bagasse, beet sugar pulp, peat or coke to form briquettes therewith, as these will prevent the powdered molasses or distillery slop solids from sticking together in a solid mass when melted on the elevation of the temperature.

I may, on the other hand, mix a caustic base with the powdered uncharred material and destructively distill the mixture and obtain thereby products of distillation, such as acetic acid, aldehyde, etc. The resultant char will then contain the caustic base mixed with the potash and will be suitable for fertilizer purposes. I may use caustic potash or caustic lime as such caustic bases. Soda might also be used, but would make the resultant char much less suitable for the production of fertilizer material. Furthermore, the caustic base, such as powdered caustic lime, may be mixed with the powdered uncharred material in the dry form; or, I may mix the caustic material with the molasses or distillery slop liquors, in liquid state, before drying and then spray-dry them together.

As an alternate method of procedure, instead of recovering the molasses and distillery slop liquors in a dry powder form and then reducing to a char, I may use the uncharred dried solid content directly as a fertilizer material. I may also mix the powder with hydrated lime; or, I may mix powdered lime, either caustic or hydrated, with the liquid materials and spray-dry them together to a powdered product.

This latter procedure has the advantage of utilizing the nitrogen compounds which are present in these materials and are valuable fertilizer constituents, but which are lost if the material is burned, charred or destructively distilled.

Moreover, the heating of the finely-divided molasses or liquor may be carried to a point that the terminal temperature of the desiccating medium is such only as to caramelize, but not coke, the resultant product which will thereby be rendered substantially nonhygroscopic.

I claim:

1. Fertilizer obtained from refuse molasses and in the form of a powder consisting of dry, charred particles.

2. Fertilizer obtained from refuse molasses and in the form of a powder consisting of non-hygroscopic particles.

3. The herein described powdered product obtained from refuse molasses by destructively distilling the molasses in finely-divided condition.

4. Process of treating refuse molasses, which consists in spraying same into a gaseous medium of a temperature sufficient to char the particles thereof.

5. The process which consists in destructively distilling refuse molasses in finely-divided state.

6. The process which consists in spraying refuse molasses into a dehydrating gaseous medium to provide same in the form of a dry powder, and destructively distilling said powder.

7. The process which consists in spraying refuse molasses into a dehydrating gaseous medium to provide same in the form of a dry powder, and destructively distilling said powder while in suspension.

8. Process for producing fertilizer material from refuse molasses, which consists in incorporating therewith a modifying substance and then subjecting same in finely-divided state to a desiccating gaseous medium.

9. Process for producing fertilizer material from refuse molasses, which consists in incorporating therewith an alkali, and then subjecting same in finely-divided state to a desiccating gaseous medium.

10. The process which consists in incorporating with refuse molasses an alkali and subjecting same in finely-divided state to a desiccating gaseous medium to provide therefrom a dry powder, and destructively distilling said powder.

Signed at New York in the county of New York and State of New York, this 28th day of December A. D. 1922.

WALTER H. DICKERSON.